United States Patent
Han et al.

(10) Patent No.: US 8,509,337 B2
(45) Date of Patent: Aug. 13, 2013

(54) METHOD FOR TRANSMITTING SYNCHRONIZATION CHANNEL USING MULTI-ANTENNA

(75) Inventors: Seung Hee Han, Anyang-si (KR); Yeong Hyeon Kwon, Anyang-si (KR); Jin Sam Kwak, Anyang-si (KR); Dong Cheol Kim, Anyang-si (KR); Sung Ho Moon, Anyang-si (KR); Min Seok Noh, Anyang-si (KR); Hyun Woo Lee, Anyang-si (KR); Jin Soo Choi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 249 days.

(21) Appl. No.: 12/988,302

(22) PCT Filed: Apr. 17, 2009

(86) PCT No.: PCT/KR2009/002025
§ 371 (c)(1),
(2), (4) Date: Dec. 29, 2010

(87) PCT Pub. No.: WO2009/128681
PCT Pub. Date: Oct. 22, 2009

(65) Prior Publication Data
US 2011/0090997 A1    Apr. 21, 2011

Related U.S. Application Data

(60) Provisional application No. 61/045,945, filed on Apr. 17, 2008, provisional application No. 61/050,630, filed on May 6, 2008, provisional application No. 61/055,144, filed on May 22, 2008.

(30) Foreign Application Priority Data

Sep. 5, 2008   (KR) .................. 10-2008-0087753

(51) Int. Cl.
*H04B 7/02* (2006.01)

(52) U.S. Cl.
USPC ............................................. 375/267

(58) Field of Classification Search
USPC ............................................. 375/267
See application file for complete search history.

(56) References Cited

U.S. PATENT DOCUMENTS

| | | | | |
|---|---|---|---|---|
| 7,839,944 B2 * | 11/2010 | Lee et al. | ...... | 375/267 |
| 8,040,975 B2 * | 10/2011 | Lee et al. | ...... | 375/299 |
| 2006/0013186 A1 * | 1/2006 | Agrawal et al. | ...... | 370/344 |

FOREIGN PATENT DOCUMENTS

| | | |
|---|---|---|
| KR | 1020060023863 | 3/2006 |
| KR | 1020070042528 | 4/2007 |
| KR | 1020070043964 | 4/2007 |

OTHER PUBLICATIONS

Ciochina, "Single-Carrier Space-Frequency Block Coding: Performance Evaluation," Fall 2007 IEEE 66th Vehicular Technology Conference, 2007. VTC-2007, Sep. 30 2007-Oct. 3 2007, pp. 715-719.*

(Continued)

*Primary Examiner* — Juan A Torres
(74) *Attorney, Agent, or Firm* — Lee, Hong, Degerman, Kang & Waimey

(57) ABSTRACT

The present invention relates to a method for transmitting a synchronization channel for using a synchronization channel as a phase reference when decoding a broadcast channel, the method includes using a pre-decided shift value for each antenna, where the shift value is pre-decided with a user equipment, so as to apply circular shifts to sequences of the synchronization channel, and transmitting the sequences having the circular shifts applied thereto from a base station to the user equipment. In performing time/frequency domain synchronization in the synchronization channel, regardless of the number of transmission antennae used by the base station when transmitting signals, the synchronization process may be performed.

10 Claims, 12 Drawing Sheets

(56) References Cited

OTHER PUBLICATIONS

Bauch, "Parameter optimization, interleaving and multiple access in OFDM with cyclic delay diversity," VTC 2004-Spring. 2004 IEEE 59th Vehicular Technology Conference, 2004, vol. 1 pp. 505-509 vol. 1.*

Zhang, "A new space-time-frequency MIMO-OFDM scheme with cyclic delay diversity," Proceedings of the IEEE 6th Circuits and Systems Symposium on Emerging Technologies: Frontiers of Mobile and Wireless Communication, 2004, vol. 2, pp. 647-650 vol. 2.*

Bauch, "Cyclic delay diversity with bit-interleaved coded modulation in orthogonal frequency division multiple access," IEEE Transactions on Wireless Communications, vol. 5, Issue: 8, Year: 2006, pp. 2092-2100.*

* cited by examiner

<Prior Art>

METHOD FOR TRANSMITTING SYNCHRONIZATION CHANNEL USING MULTI-ANTENNA

CROSS-REFERENCE TO RELATED APPLICATIONS

This application is the National Stage filing under 35 U.S.C. 371 of International Application No. PCT/KR2009/002025, filed on Apr. 17, 2009, which claims the benefit of earlier filing date and right of priority to Korean Application No. 10-2008-0087753, filed on Sep. 5, 2008, and also claims the benefit of U.S. Provisional Application Ser. Nos. 61/055,144, filed on May 22, 2008, 61/050,630, filed on May 6, 2008, and 61/045,945, filed on Apr. 17, 2008, the contents of which are all hereby incorporated by reference herein in their entirety.

BACKGROUND OF THE INVENTION

1. Field of the Invention

The present invention relates to a method for transmitting a synchronization channel using multi-antenna and, more particularly, to a method for transmitting a synchronization channel in order to enhance a diversity performance (or capability) of a Broadcast Channel (BCH) or control channel.

2. Discussion of the Related Art

A synchronization channel is referred to differently depending upon the respective system. For example, in the 3GPP LTE, the synchronization channel is referred to as a Synchronization Signal (SS), and, in the IEEE802.16e, the synchronization channel is referred to as a preamble. Therefore, the synchronization channel collectively refers to a channel and/or signal used by a user equipment (or terminal) for performing time and/or frequency synchronization with a base station.

Generally, a base station transmits a signal through a plurality of antennae (i.e., more than one antenna). Herein, the number of antennae used may be indicated to the user equipment through a synchronization channel, or a broadcast channel (hereinafter referred to as "BCH"), a control channel, a data channel, and so on. However, at a time point when the user equipment initially performs synchronization with the base station, the base station is unable to determine the number of channels that have been used for the transmission. Accordingly, in this case, the base station may transmit a synchronization channel to the user equipment by adopting a transparent transmission method. Examples of the diversity method, which may be performed without knowing the number of antennae transmitted by the user equipment, may include Time Switched Transmit Diversity (hereinafter referred to as "TSTD"), Precoding vector Switching (hereinafter referred to as "PVS"), Cyclic Delay Diversity (hereinafter referred to as "CDD"), and so on.

Hereinafter, an example of transmitting a synchronization channel through 2 antennae when performing TSTD will be given in the following description for simplicity. In this example, it is assumed that the synchronization channel is transmitted at a cycle period of 10 ms. Accordingly, at the time point t=T0, the synchronization channel is transmitted only through Antenna 0 (herein, Antenna 1 is turned off). At the time point t=T0+10 ms, the synchronization channel is transmitted only through Antenna 1. And, at the time point t=T0+20 ms, the synchronization channel is transmitted only through Antenna 0. In other words, TSTD refers to a method of transmitting a synchronization channel by alternating antennae at different time points. By using this method, Time Diversity Gain may be obtained by using a time variant channel characteristic of TSTD. And, since it may appear to the user equipment as though the base station performs transmission by using only one antenna, the user equipment may be capable of detecting the transmitted signal without difficulty, even without knowing the number of antennae used by the base station to perform transmission.

Hereinafter, an example of transmitting a synchronization channel through 2 antennae when performing PVS will be given in the following description for simplicity. In this example, it is assumed that the synchronization channel is transmitted at a cycle period of 10 ms. Accordingly, at the time point t=T0, a transmission signal is multiplied by a precoding vector of $[+1\ +1]^T$ and then transmitted. More specifically, in Antenna 0, the transmission signal is multiplied by 1 and then transmitted, and, in Antenna 1, the transmission signal is multiplied by 1 and then transmitted. Also, at the time point t=T0+10 ms, a transmission signal is multiplied by a precoding vector of $[+1\ -1]^T$ and then transmitted. More specifically, in Antenna 0, the transmission signal is multiplied by 1 and then transmitted, and, in Antenna 1, the transmission signal is multiplied by −1 and then transmitted. Therefore, by using this method, PVS may vary the channels through time-based precoding, thereby acquiring Time Diversity Gain even in a low mobility environment. And, since it may appear as though the base station performs transmission to the user equipment by using only one antenna (i.e., MS transparent), the user equipment may be capable of detecting the transmitted signal without difficulty, even without knowing the number of antennae used by the base station to perform transmission.

Hereinafter, an example of transmitting a synchronization channel through 2 antennae when performing CDD will be given in the following description for simplicity. In this example, it is assumed that the synchronization channel is transmitted at a cycle period of 10 ms. Herein, different delays respective to each antenna are applied to the time domain signal, which is received through each antenna. Then, the processed signal is transmitted. At this point, the signal prior to being applied with the delay transmits identical signals between each antenna. This increases the size (or amount) of a multi-path, thereby increasing a frequency selectively of the corresponding channel. Accordingly, the receiving end may detect a signal by using the same method as when using only one antenna regardless of the number of antennae used by the transmitting end. More specifically, the user equipment is not required to know the delay value applied by the transmitting end. However, this corresponds to when a small delay within a number sample is applied. In other words, when a large delay corresponding to one-half (½) or one-quarter (¼) of an Orthogonal Frequency Division Multiplexing (OFDM) symbol length is applied, it is preferable that the user equipment is informed in advance of the applied delay value.

Generally, cell identification (ID) information may be carried in the synchronization channel so as to be transmitted. In other words, the synchronization channel is carried in a time/frequency/code unique to each cell, thereby being transmitted. Therefore, after performing the initial synchronization, when demodulating a signal such as a broadcast channel (BCH) or data, a channel may be estimated by using a synchronization channel instead of a pilot, or by combining a pilot and a synchronization channel.

Since the synchronization channel has a greater density that a general pilot channel in the frequency domain, the channel estimation performance may be largely enhanced. Hereinafter, in order to simplify the description of the present invention, the BCH will be described as an example of a channel that can demodulate data through the synchronization channel.

A Space Frequency Block Code (SFBC) corresponds to a branch of rank-1 transmission among many multi-antenna transmission methods. Herein, the Space Frequency Block Code (SFBC) refers to a method of obtaining diversity gain by multiplying the transmission signal by the SFBC. This method corresponds to a method applying a Space Time Block Code (STBC) proposed by Alamouti to the frequency domain.

FIG. 1 illustrates a block view of an STBC transmission.

When M_rx corresponds to a number of receiving antennae, SFBC applies the row of a 2×M_rx matrix of an STBC encoder as the frequency domain.

Generally, in light of spatial diversity in a rank-1 transmission, it is known that SFBC (or STBC) is yields its best performance within the same environment. In other words, SFBC ensures a more outstanding performing as compared to other rank-1 transmissions, such as TSTD, PVS, CDD, and so on. Nevertheless, in order to perform decoding, channel estimation for each transmitting antenna is required to be performed.

In the related art method, the TSTD/PVS/CDD is used in the synchronization channel, and TSTD/PVS/CDD completely identical to that applied to the synchronization channel is used in the BCH. Herein, the synchronization channel should be used as a phase reference or an amplitude reference for BCH decoding. However, if an antenna transmission method such as TSTD/PVS/CDD is used in the synchronization channel, the same TSTD/PVS/CDD should be used in the BCH. And, accordingly, since channel estimation cannot be performed for each antenna, SFBC yielding the most optimal performance cannot be used.

SUMMARY OF THE INVENTION

Accordingly, the present invention is directed to a method for transmitting a synchronization channel using multi-antenna that substantially obviates one or more problems due to limitations and disadvantages of the related art.

Another object of the present invention is to provide a method for transmitting a synchronization channel using multi-antenna that allows an application of transmission diversity when transmitting data.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a method for transmitting a synchronization channel for using a synchronization channel as a phase reference when decoding a broadcast channel, the method for transmitting a synchronization channel includes using a pre-decided shift value for each antenna, wherein the shift value is pre-decided with a user equipment, so as to apply circular shifts to sequences of the synchronization channel, and transmitting the sequences having the circular shifts applied thereto from a base station to the user equipment. Herein, a space frequency block code (SFBC) or a space time block code (STBC) may be applied to the broadcast channel.

Preferably, the step of applying circular shifts may correspond to a step of using the same mother sequence for each antenna.

Alternatively, in the step of applying circular shifts, different mother sequences may also be used for each antenna.

Preferably, the method for transmitting a synchronization channel according to an embodiment of the present invention may further include adding a cyclic prefix (CP) to a sequence having the circular shift applied thereto.

Preferably, a length of the cyclic prefix (CP) may be shorter than the shift value.

Preferably, the synchronization channel may correspond to a time domain wave being repeated 2 times within a single OFDM symbol.

Preferably, the synchronization channel may correspond to a time domain wave being repeated 3 times or more within a single OFDM symbol with respect to the size of the signal.

To achieve these objects and other advantages and in accordance with the purpose of the invention, as embodied and broadly described herein, in another aspect of the present invention, in a method for transmitting a synchronization channel for using a synchronization channel as a phase reference when decoding a broadcast channel, the method for transmitting a synchronization channel includes transmitting information on different shift values for each antenna to a user equipment, using the shift values so as to apply circular shifts to sequences of the synchronization channel, and transmitting the sequences having the circular shifts applied thereto from a base station to the user equipment. Herein, the information on the other shift value may be transmitted to the user equipment through implicit/explicit signaling or may be defined in advance. Herein, SFBC or STBC may be applied to the broadcast channel.

Preferably, in the step of applying circular shifts the same mother sequence may be used for each antenna.

Preferably, the method for transmitting a synchronization channel according to another embodiment of the present invention may further include adding a cyclic prefix (CP) to a sequence having the circular shift applied thereto.

To achieve these objects and other advantages and in accordance with the purpose of the invention, as embodied and broadly described herein, in a further aspect of the present invention, in a method for transmitting a synchronization channel for using a synchronization channel as a phase reference when decoding a control channel, the method for transmitting a synchronization channel includes using a pre-decided shift value for each antenna, wherein the shift value is pre-decided with a user equipment, so as to apply circular shifts to sequences of the synchronization channel, and transmitting the sequences having the circular shifts applied thereto from a base station to the user equipment. Herein, SFBC or STBC may be applied to the broadcast channel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
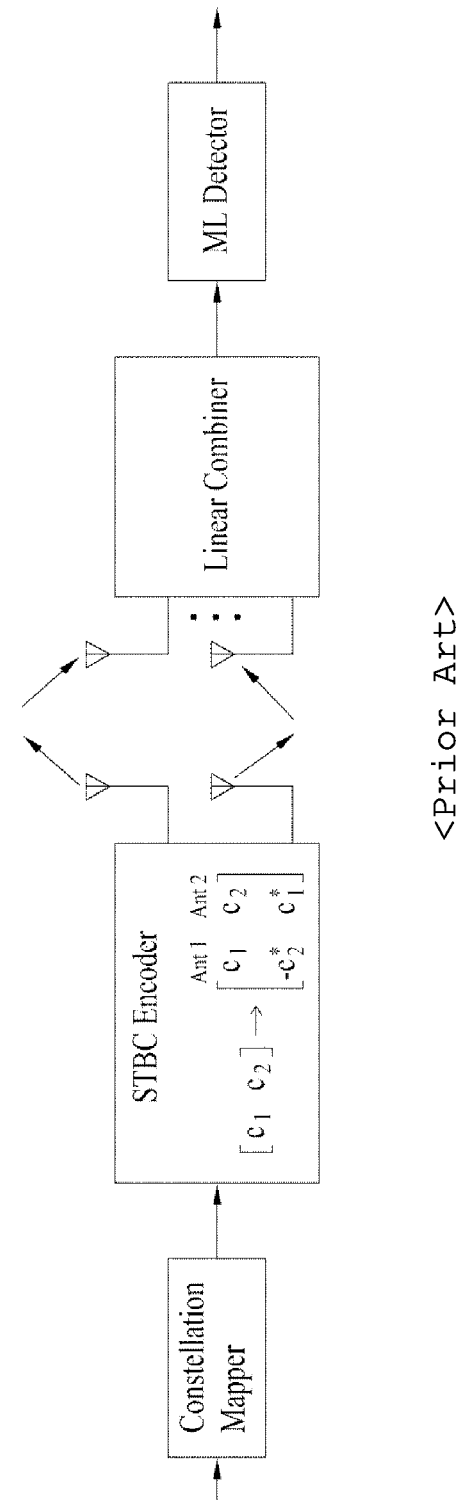
FIG. 1 illustrates a block view of an STBC transmission.

Reference will now be made in detail to the preferred embodiments of the present invention, examples of which are illustrated in the accompanying drawings. Wherever possible, the same reference numbers will be used throughout the drawings to refer to the same or like parts. Nevertheless, the embodiment of the present invention described below may be modified to a wide range of modifications. And, therefore, it should be understood that the present invention will not be limited only to the example presented in the description of the present invention set forth herein.

In the example given according to the embodiment of the present invention, the user equipment performs channel estimation for each antenna by using the synchronization channel, thereby using the synchronization channel as a phase reference for decoding the BCH. At this point, the constraints shown in the related art method of having to apply the same antenna transmission method to the synchronization channel and the BCH have been eliminated in the example according to the embodiment of the present invention. Accordingly, by allowing all types of antenna methods to be applied to the BCH, an optimal system design may be provided.

In the description of the present invention, the synchronization channel may also be referred to as an Advanced preamble (also referred to as an "A-preamble"). And, herein, the A-preamble may be configured of a Primary Advanced preamble (hereinafter referred to as a "PA-preamble") and a Secondary Advanced preamble (hereinafter referred to as an "SA-preamble"). Herein, the method for transmitting a synchronization channel according to the embodiment of the present invention is applied to at least one of the PA-preamble and the SA-preamble.

Furthermore, the BCH may also be referred to as a Super Frame Header (hereinafter referred to as "SFH"). And, herein, the SFH may be configured of a Primary Super Frame Header (hereinafter referred to as "P-SFH") and a Secondary Super Frame Header (hereinafter referred to as "S-SFH").

According to the embodiment of the present invention, SFBC (STBC) is applied to the BCH, and channel estimation may be performed for each antenna in the synchronization channel.

Also, according to the embodiment of the present invention, the base station performs a time/frequency circular shift on a sequence of the synchronization channel as much as a shift delay, which corresponds to an arbitrary value for each antenna. A relative shift value based upon a specific position (e.g., Antenna 0) may vary for each antenna. And, at this point, each of the different shift values may correspond to each antenna number. Herein, the sequence being transmitted through each antenna may all be the same or may all be different from one another. At this point, the time/frequency circular shift is equivalent to being multiplied by a Phase Rotation Sequence in the frequency/time domain.

Hereinafter, the description will be based on a discrete domain for simplicity.

First of all, a specified time domain CDD according to the embodiment of the present invention will now be described in detail.

$$= a_0((n+r \cdot \delta) \bmod N)$$

$$= A_{r-1}(k) e^{-j2\pi k \delta/N}$$

$$= A_0(k) e^{-j2\pi k r \delta/N}$$

For example, the relationship between signal a(n) (wherein n=0, 1, ..., N−1) of the time domain and signal A(k) (wherein k=0, 1, ..., N−1) of the frequency domain is as shown in Equation 1. More specifically, A(k) may be acquired by performing Discrete Fourier Transform (hereinafter referred to as "DFT") on a(n), and a(n) may be acquired by performing Inverse Discrete Fourier Transform (hereinafter referred to as "IDFT") on A(k).

$$A(k) = \sum_{n=0}^{N-1} a(n) e^{-j2\pi kn/N}, \quad k = 0, 1, \ldots, N-1 : DFT \quad \text{[Equation 1]}$$

$$a(n) = \frac{1}{N} \sum_{k=0}^{N-1} A(k) e^{j2\pi kn/N}, \quad n = 0, 1, \ldots, N-1 : IDFT$$

Herein, when $a_r(n)$ represents the signal being transmitted from an $r^{th}$ transmission antenna (wherein r=0, 1, ..., N_tx−1), and when δ signifies a shift offset between each antenna, then $a_r(n)$ may be expressed as shown in Equation 2 below. Herein, the shift offset may correspond to a real number or an integer, and, in the following description, it is assumed that the shift offset is an integer.

$$a_r(n) = a_{r-1}((n+\delta) \bmod N) \quad \text{[Equation 2]}$$
$$= a_0((n + r \cdot \delta) \bmod N)$$
$$r = 1, \ldots, N_{tx} - 1$$
$$n = 0, \ldots, N - 1$$

In Equation 2, it is assumed that the shift values between each antenna are spaced apart at equal intervals. However, the present invention will not be limited only to the example presented herein. And, therefore, there may include cases wherein the shift values between each antenna are spaced apart at unequal intervals.

The time domain circular shift of Equation 2 is identical to a phase rotation sequence of the frequency domain, as shown in Equation 3.

$$A_r(k) = \sum_{n=0}^{N-1} a_r(n)e^{-j2\pi kn/N} \quad \text{[Equation 3]}$$
$$= A_{r-1}(k)e^{-j2\pi k\delta/N}$$
$$= A_0(k)e^{-j2\pi kr\delta/N}$$
$$r = 1, \ldots, N_{tx} - 1$$
$$k = 0, \ldots, N - 1$$

Figure 2:
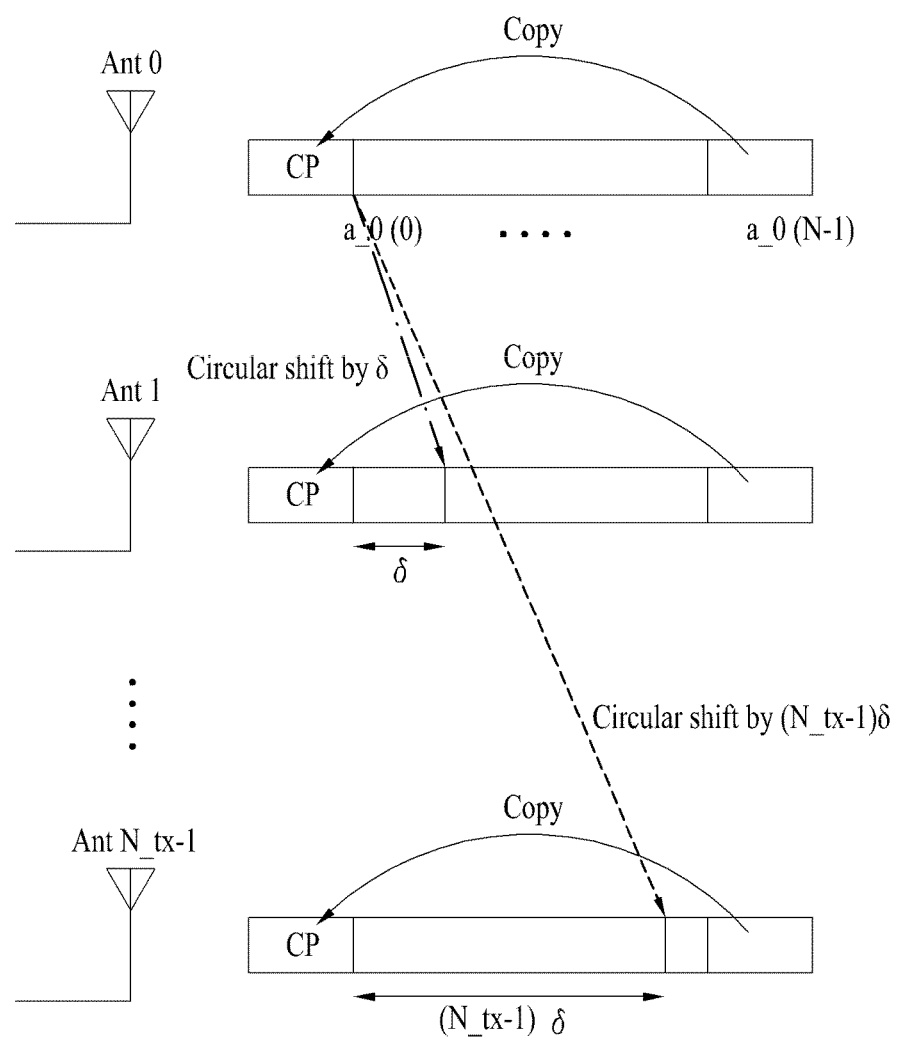
FIG. 2 illustrates an example of applying a predetermined shift value for each antenna to a sequence and transmitting the sequence.

FIG. 2 shows an example of applying a shift value of r·δ for each antenna (wherein r represents an antenna index) to a sequence, thereby transmitting the processed sequence.

At this point, it is preferable that a Cyclic Prefix (CP) is added after the circular shift. By using the above-described method, the user equipment may be capable of transparently detecting a synchronization channel even when the user equipment is unaware of the number of transmission antennae. Accordingly, the user equipment may perform channel estimation.

FIG. 2 shows an example wherein the same signal (or sequence) is used for each antenna and wherein only the shift values are different from one another. However, the present invention will not be limited only to the example presented herein. Therefore, different signals may be used for each antenna, and the applied shift values may also be different from one another.

Also, in order to perform channel estimation for the BCH, the shift value should be set up (or determined) while taking into consideration a maximum delay spread of the channel. Generally, since a CP length is set up while talking into consideration the maximum delay spread of the channel, it is preferable that the difference in shift values between the antennae is greater (or longer) than the CP length. For example, it is assumed that the length of an OFDM symbol is 100 us and the length of a CP is 12.5 us. It is also assumed that the number of antennas used is equal to 4. At this point, a circular shift offset value between the antennae may be set to 25 us (=100 us/4). Herein, since 25 us is greater than 12.5 us, which corresponds to the CP length taking into account the maximum delay spread of the corresponding channel, the channel estimation process may be performed perfectly. If the OFDM symbol is configured of an N=1024 sample, 1024-point Inverse Fast Fourier Transform (IFFT) is performed, and settings may be made to δ=256 [samples], which corresponds to setting prior to performing the Digital-to-Analog Conversion (DAC). While taking the CP into consideration, a maximum of 8 (=100 us/12.5 us) circular shifts may be used.

Preferably, in a CDD-based preamble structure design, in order to maximum the channel estimation effect through a multi-antenna support, consideration needs to be made on the shift delay value for each antenna.

Figure 3:
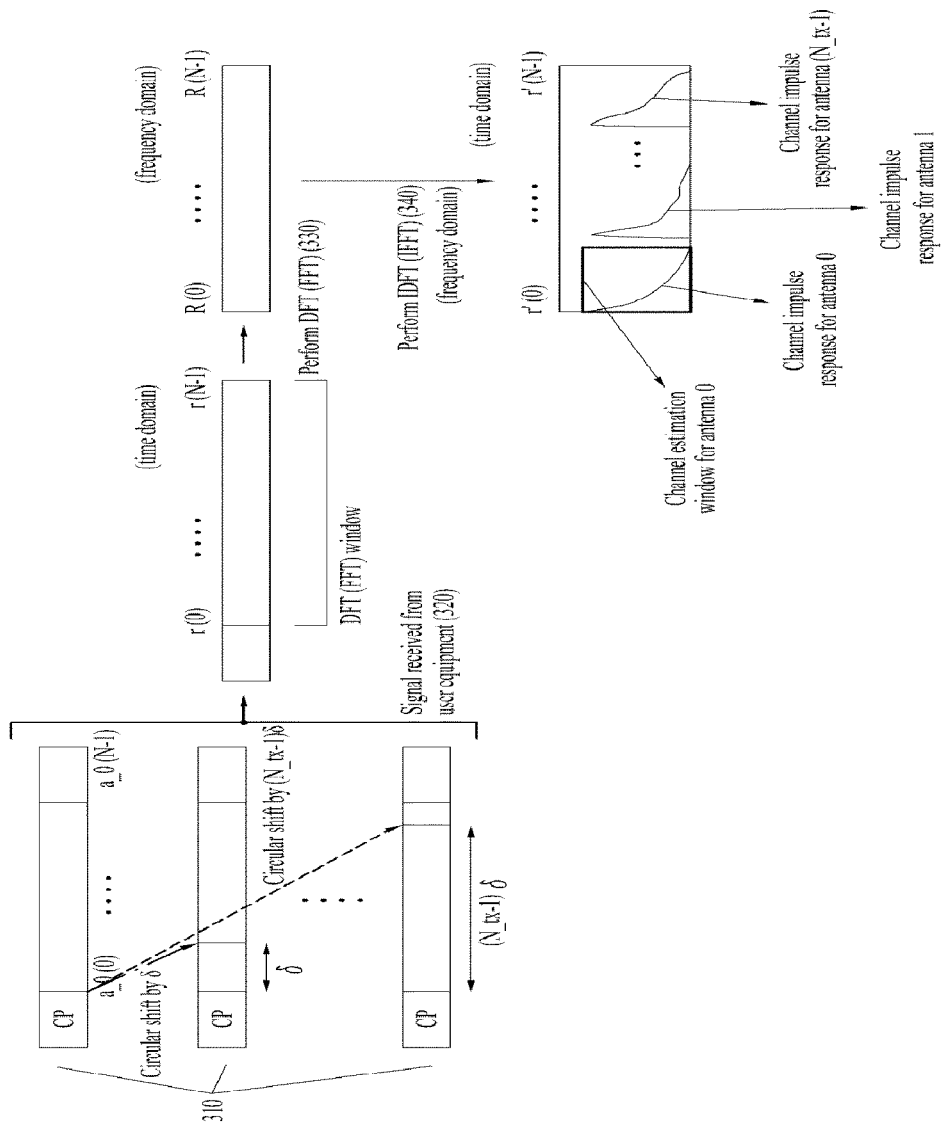
FIG. 3 illustrates an example of a user equipment performing channel estimation for each antenna on a received signal.

As shown in FIG. 3, a shift delay value respective to when performing a multi-antenna transmission through the CDD, may influence the time window settings when performing channel estimation for each antenna in the time domain.

Equal settings may be made in the CDD shift delay for each antenna, or equal settings may be made in the CDD shift delay between the antennae.

When considering a delay profile of a multiple-path channel, if the channel characteristics for each antenna exceeds a shift delay, a signal of a channel being set up as a neighboring shift delay within a time window, when performing channel estimation for each antenna, may act as an interference within the corresponding window. Accordingly, the channel estimation performance of the corresponding antenna may be degraded. In order to minimize the influence of an interference occurring within a neighboring delay shift window for each antenna, it is preferable to make equal CDD shift delay settings during a corresponding time period, thereby ensuring an equal channel estimation performance. Generally, a channel characteristic between antennae shows the same influence as that of a channel delay profile through a multiple-path. And, as a channel correlation between antennae includes, the similarity in channel characteristics between neighboring antennae becomes closer. Furthermore, when considering CP settings, which take into account an Excess Delay Profile of a multiple-path channel, it is preferable that the channel delay profile of a particular antenna does not have a very long excess delay profile.

As a result, the channel excess delay profiles between antennae have similar characteristics, and, in order to effectively perform channel estimation during a CDD-based preamble transmission, it is preferable to set up equal shift delay settings in the light of minimizing influence caused by interference of a neighboring shift delay. Herein, setting up equal shift delay setting may be defined as aligning antennae by an order respective to the shift delays and setting the shift delays to have the same difference values. At this point, the shift delay is not required to be applied in the order of the antennae. For example, the delay interval between Antenna 0 and Antenna 1, the delay interval between Antenna 1 and Antenna 2, the delay interval between Antenna 2 and Antenna 3, and the delay interval between Antenna 3 and Antenna 0 may be identical to one another, or the delay interval between Antenna 1 and Antenna 3, the delay interval between Antenna 3 and Antenna 2, the delay interval between Antenna 2 and Antenna 0, and the delay interval between Antenna 0 and Antenna 1 may be identical to one another.

Meanwhile, the same CDD shift delays may be set up as a function between a repetition factor of a preamble and the number of antennae.

In order to set up equal CDD shift delay values, a time window for performing channel estimation for each antenna in the time domain and the delay profile of the corresponding channel should be taken into consideration simultaneously. Also, by considering the repetition factor of a preamble in the time domain, settings allowing channel estimation of a multi-antenna to be performed within a single wave are required to be made.

Generally, the delay profile of a channel does not exceed the CP length. Therefore, the shift delay is required to be defined within the range equal to or greater than the CP length. Taking this detail into account, in order to effectively perform channel estimation for each antenna, a relation between the repetition factors within the time domain and the number of transmission antennae is required to be determined. More specifically, when it is assumed that a preamble taking into account a wave having k number of repetitions within the time domain is used, when it is assumed that Tu represents the length of an OFDM symbol section (herein, the CP length may be excluded), and when it is assumed that $N_{tx}$ signifies the number of transmission antennae, the effective shift delay may be set to $\delta = Tu/(k*N_{tx})$. For example, in case of a wave having 2 repetitions (k=2), it is preferable that the shift delay is determined based upon the number of transmission antennae as shown in Equation 4 and Equation 5 below.

$$2TX \text{ antennas: } \delta = \tfrac{1}{4}Tu \qquad \text{[Equation 4]}$$

When considering that 2 transmission antennae are used, a shift delay corresponding to ¼ of the OFDM symbol length may be set up. Accordingly, the shift delay of Antenna 0 (Ant 0) may be set as 0, and the shift delay of Antenna 1 (Ant 1) may be set as ¼ Tu.

$$4TX \text{ antennas: } \delta = \tfrac{1}{8}Tu \qquad \text{[Equation 5]}$$

When considering that 4 transmission antennae are used, a shift delay corresponding to ⅛ of the OFDM symbol length may be set up. Accordingly, the shift delay of Antenna 0 (Ant 0) may be set as 0, the shift delay of Antenna 1 (Ant 1) may be set as ⅛ Tu, the shift delay of Antenna 2 (Ant 2) may be set as ⅖ Tu, and the shift delay of Antenna 3 (Ant 3) may be set as ⅜ Tu.

The values mentioned above may also be converted to sampling frequency. In case of a fixed shift delay value, which is set up as described above, the mapping for each antenna may be performed arbitrarily. Also, each time a preamble is transmitted, the shift value for each antenna may also be changed. Furthermore, the shift delay defined in the time domain may be interpreted as a phase rotation sequence in the frequency domain.

Hereinafter, a process of receiving the sequence shown in FIG. 2 and performing channel estimation for each antenna will be described in detail. At this point, it is assumed that the signals being transmitted through the antennae all use the same sequence and that only the shift delay values for each antenna are set up differently.

FIG. 3 illustrates an example of the user equipment performing channel estimation for each antenna by using a receiving signal.

Since the signals 310 transmitted from each antenna have the same propagation delay, the received signals 320 respectively undergo a channel for each antenna and are all added at the same time position. When applying the embodiment of the present invention, regardless of the number of antennae used by the base station, the user equipment considers the transmission to be performed by 1 Tx, thereby performing time/frequency synchronization and also performing cell ID detection. In this example, it is assumed that time/frequency synchronization via the synchronization channel has already been performed and that the cell ID detection process has been completed. After converting the signal to a frequency domain signal (this process may already be performed during the cell ID detection step) via Fast Fourier Transform (FFT) 330, when performing IFFT 340, after multiplying each element (i.e., element-by-element) by a conjugation value of a frequency domain signal respective to Antenna 0, a channel impulse response for each antenna may be shown in the shift value position defined for each antenna.

Accordingly, a wanted (or desired) antenna channel may be selected through a windowing process, and, after performing the windowing process, the selected antenna channel may be converted to a frequency domain, thereby enabling a frequency domain channel value to be estimated for each antenna. At this point, the process steps of performing DFT (FFT) after performing the windowing process in the time domain, so as to convert a selected antenna channel to a frequency domain, correspond to the equivalent of directly performing filtering in the frequency domain.

The channels for each antenna that are estimated by applying the embodiment of the present invention maintain orthogonality through by performing circular shift. Accordingly, it is advantageous in that channel estimation for each antenna can be performed with an outstanding performance.

If the above-described channel estimation for each antenna can be performed, the BCH may use the channel value for each antenna estimated from the synchronization channel so as to use N_tx number of antennae, thereby being capable of adopting the SFBC method. Since many methods of adopting modified SFBC format for at least 3 or more antennae are available, detailed description of the same will be omitted for simplicity. In short, the following exemplary cases of applying a modified SFBC format using 4 antennae to the BCH may be considered.

As a first exemplary case, 2 antenna groups each consisting of 2 transmission antennae may be configured, and a 2Tx SFBC may be applied to each group, so as to create a format applying FSTD between each group (2Tx SFBC+FSTD). As a second exemplary case, 2 antenna groups each consisting of 2 transmission antennae may be configured, and a 2Tx SFBC may be applied to each group, so as to create a format applying TSTD between each group (2Tx SFBC+TSTD). Finally, as a third exemplary case, SFBC may be performed on 2 transmission antennae, and a precoding vector may be applied to the processed transmission antennae, so as to create a format applying PVS (2Tx SFBC+PVC). For example, transmission may be performed in a matrix multiplication format of [a_0 a_1 a_2 a_3].'=P*C*s. Herein, a_n signifies a signal being transmitted to an antenna n port, and P represents a 4×2 precoding matrix, C indicates a 2×2 matrix performed SFBC, and s represents a 2×1 data transmission vector.

In another exemplary format, provided that a base station can use 2 to 4 transmission antennae, a shift value is set up only for the minimum number (i.e., 2) of available antennae Antenna 0 and Antenna 1, and a transparent transmission method (PVS, TSTD, CDD, etc.) may be applied to the remaining 2 antennae.

A specific frequency domain CDD according to an embodiment of the present invention corresponds to a method of transmitting a synchronization channel by applying circular shift having a unique shift value. The application method is identical to the above-described time domain CDD. However, the only difference is that the shift is applied in the frequency domain.

A detailed example of a specific time domain CDD according to an embodiment of the present invention will now be described.

In this example, it is assumed that 4 transmission antennae are used and that a 2× repetition wave is used in the synchronization channel. This example describes a case wherein, in the application the specific time domain CDD, a time domain wave of a synchronization channel is repeated twice (2 times) within a single OFDM symbol, when the base station uses 4 transmission antennae to transmit a signal. When N is an integer greater than or equal to 2 (N>=2), it is apparent that the embodiment of the present invention can be equally applied in an Nx repetition structure.

To facilitate the understanding of the present invention, the 2× repetition will now be described in detail.

Figure 4:
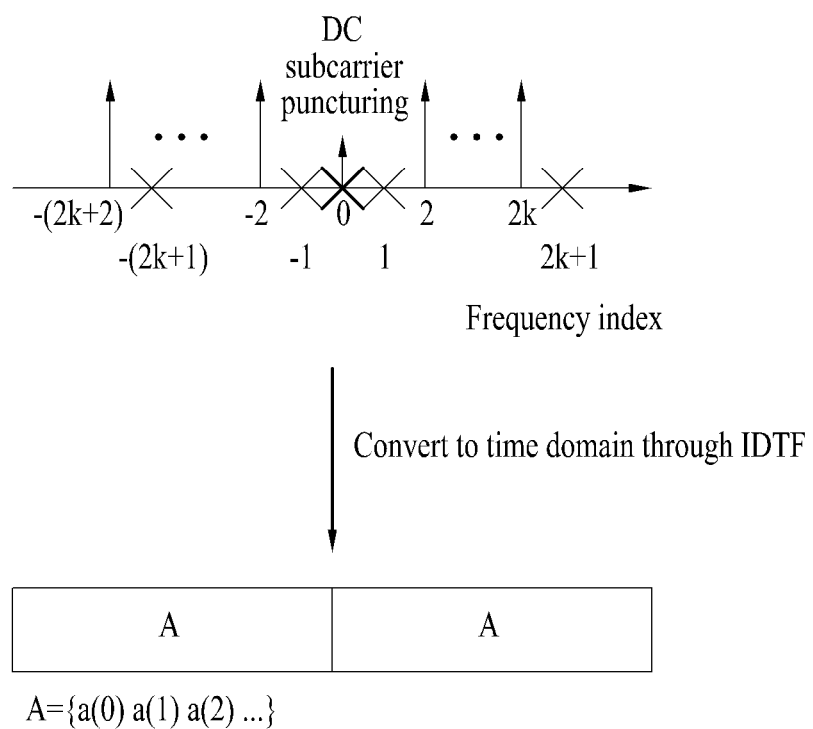
FIG. 4 illustrates a case wherein a sequence is mapped only to a sub-carrier of an even-number index in a frequency domain.

FIG. 4 illustrates a case wherein a sequence is mapped only to a sub-carrier of an even-number index in a frequency domain.

In FIG. 4 to FIG. 9, k represents an arbitrary (or random) integer. FIG. 4 shows an example of a sequence being inserted only in a subcarrier of an even-number index. In this example, the wave is repeated 2 times in a [A A] format. At this point, since the DC subcarrier has an index of 0, the sequence should be loaded. However, due to problems in DC offset, in a general transmission of the OFDM, transmission is not made to the DC subcarrier. FIG. 4 shows an example of first inserting the corresponding sequence and then performing a puncturing process.

Figure 5:
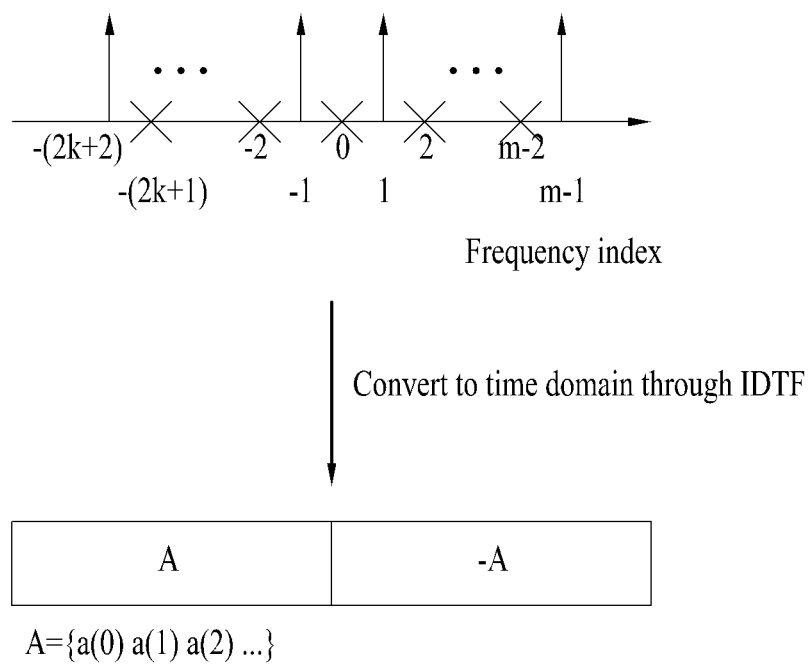
FIG. 5 illustrates a case wherein a sequence is mapped only to a sub-carrier of an odd-number index in a frequency domain.

FIG. 5 illustrates a case wherein a sequence is mapped only to a sub-carrier of an odd-number index in a frequency domain.

FIG. 5 shows an example of a sequence being inserted only in a subcarrier of an odd-number index. In this example, the wave is repeated 2 times in a [A–A] format.

Figure 6:
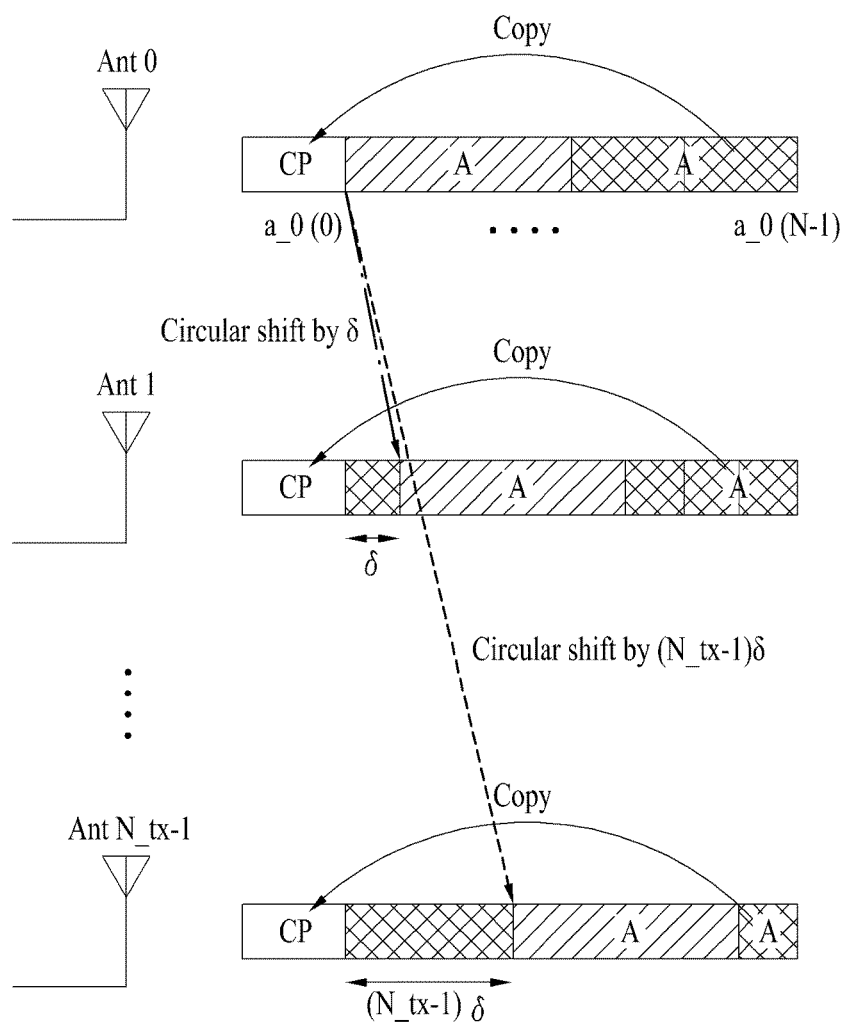
FIG. 6 illustrates a result of applying CDD according to an embodiment of the present invention to a synchronization channel having the above-described structure.
Figure 7:
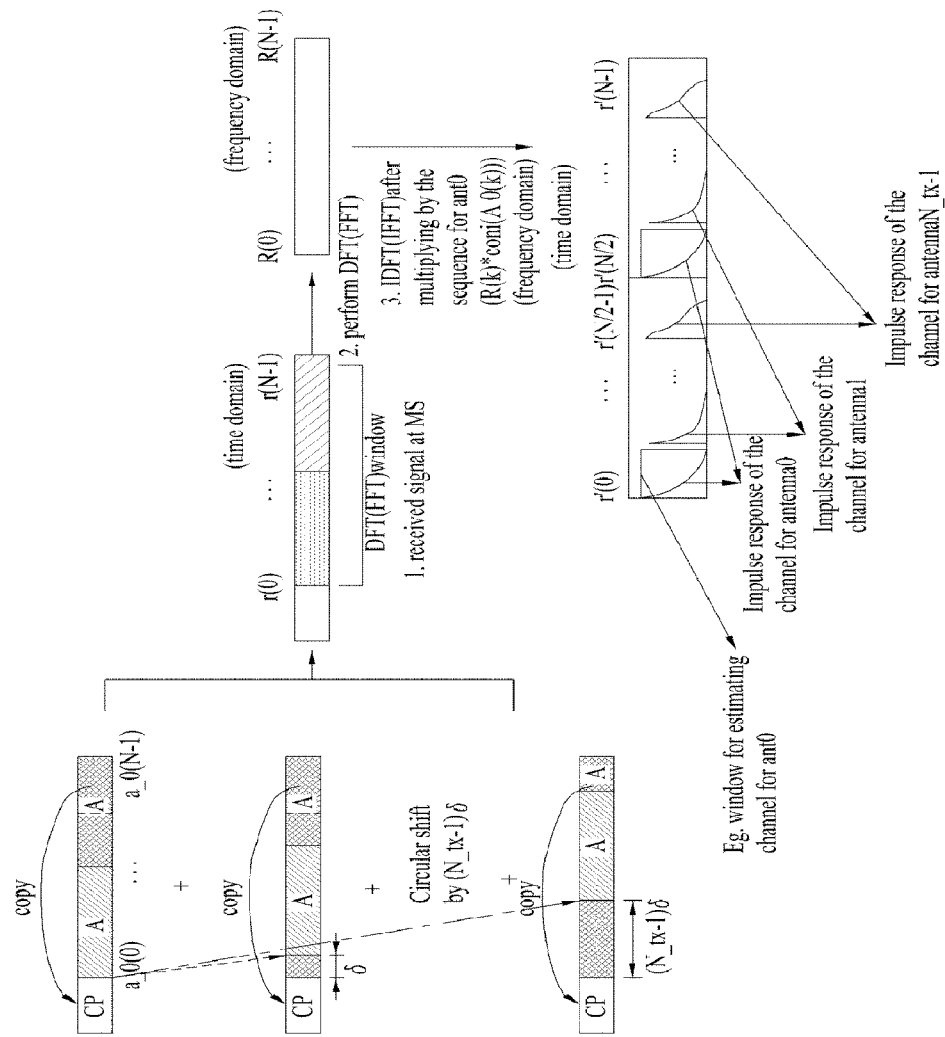
FIG. 7 illustrates a process of the user equipment estimating a channel of each antenna according to the embodiment of the present invention.

FIG. 6 illustrates a result of applying CDD according to an embodiment of the present invention to a synchronization channel having the above-described structure. And, FIG. 7 illustrates a process of the user equipment estimating a channel of each antenna according to the embodiment of the present invention. More specifically, FIG. 7 shows the process of receiving the synchronization channel shown in FIG. 6 and using the received signal so as to estimate the channel of each antenna.

For each antenna, since all signals are transmitted from even-number indexes within the frequency domain, the combined received signal may also be placed in an even-numbered position. Also, generally, in a synchronization channel having an Nx repetition structure, the repetitive characteristic of the corresponding synchronization channel is used to perform synchronization through self-relation. Therefore, without influencing the self-relation method performing synchronization at the beginning, a unique circular shift may be applied to each antenna.

In order to allow a user equipment to estimate a Multiple-Input Multiple Output (MIMO) channel, it is preferable that the shift offset between the antennae is longer than the CP length. The CDD according to the embodiment of the present invention is realized by a phase rotation within the frequency domain or by a circular shift within the time domain.

In this case, the number of available shift values may be reduced due to the repetitive characteristics. Herein, in case of a wave being repeated twice, the number of available shift values is reduced by ½. For example, it is assumed that the length of an OFDM symbol is 100 us and the length of a CP is 12.5 us. It is also assumed that the number of antennae used is equal to 4. At this point, considering the CP length, the available number of maximum shift values is equal to 4 (=100 us/12.5 us/2). At this point, by applying the shift offset of 12.5 us for each antenna, 4 shift values may be assigned for performing antenna-specific channel estimation. If the OFDM symbol is configured of an N=1024 sample, 1024-point IFFT is performed, and settings may be made to δ=256 [samples], which corresponds to setting prior to performing the DAC conversion.

Figure 8:
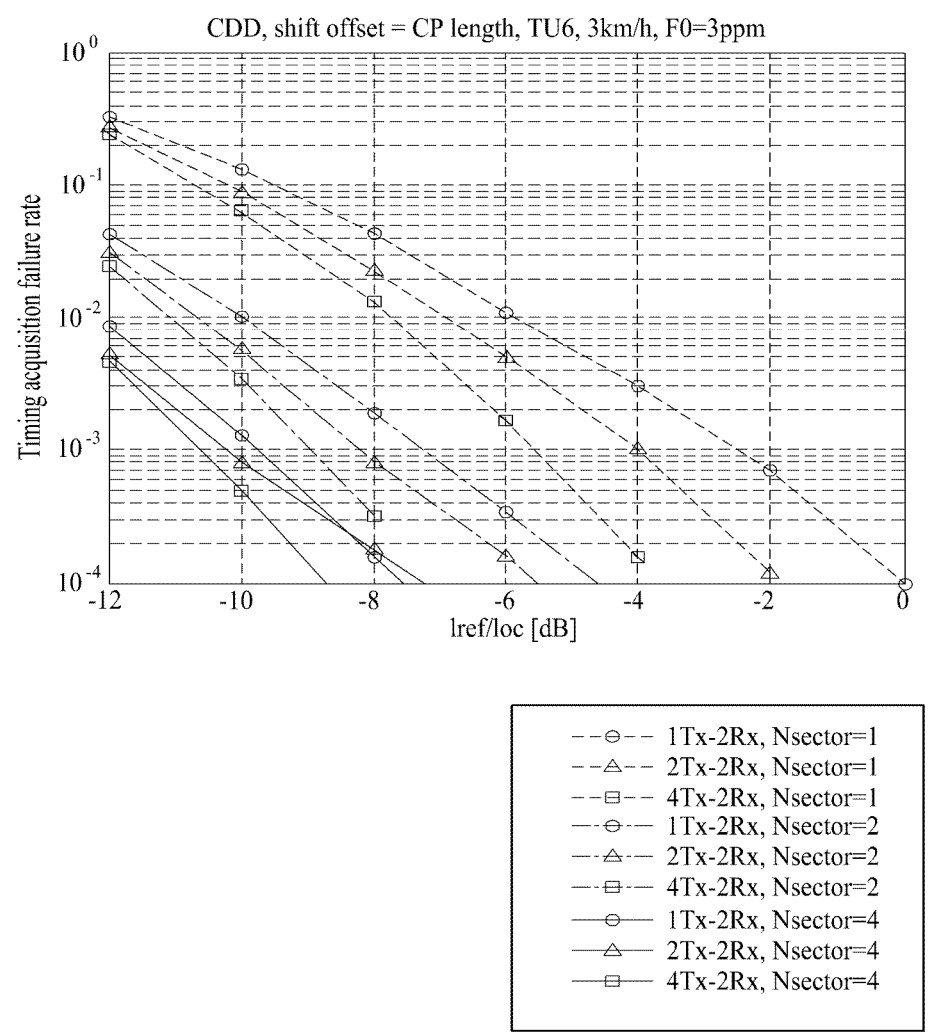
FIG. 8 and FIG. 9 respectively illustrate diversity gain of a method for transmitting a synchronization signal according to the embodiment of the present invention.
Figure 9:
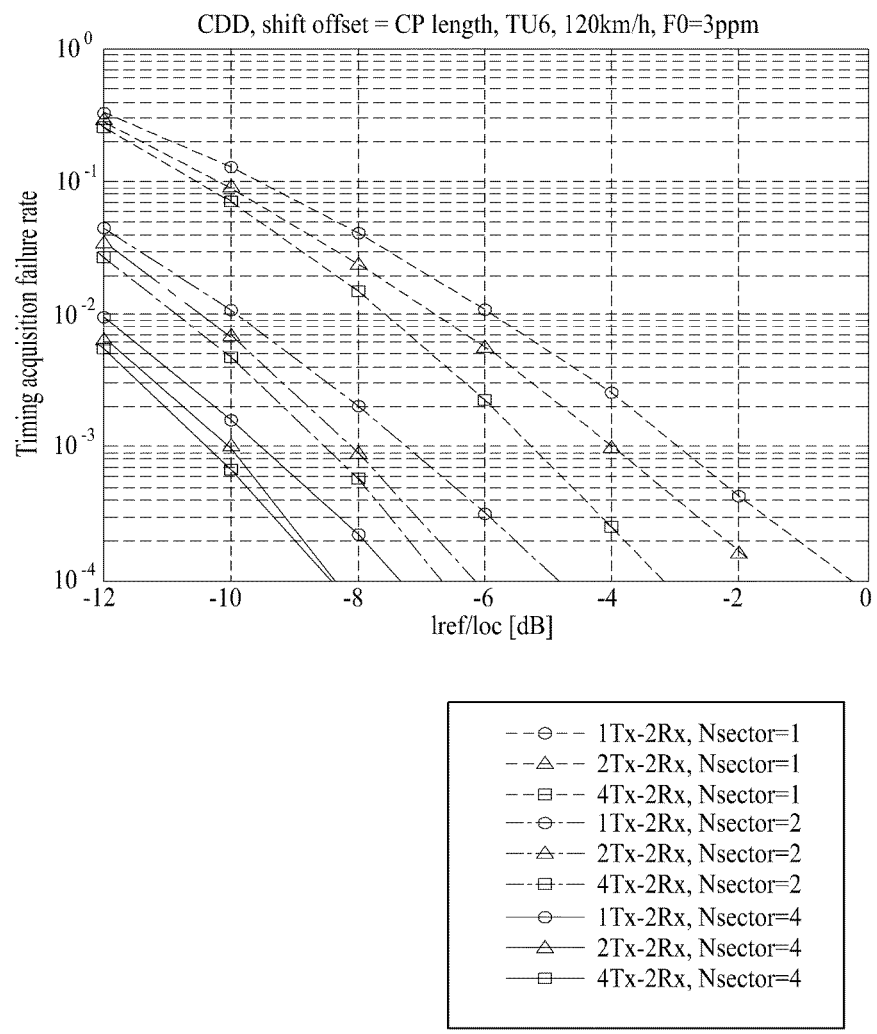

FIG. 8 and FIG. 9 respectively illustrate diversity gain of a method for transmitting a synchronization signal according to the embodiment of the present invention.

Referring to FIG. 8 and FIG. 9, $N_{sector}$ indicates the number of sectors. As shown in FIG. 8 and FIG. 9, it is apparent that as the number of sectors becomes larger and as the number of transmission antennae becomes larger, the performance becomes more outstanding.

Hereinafter, a specific time domain CDD according to the embodiment of the present invention, when it is assumed that 4 transmission antennae are used and that the synchronization channel has a 3× repetition structure, will now be described in detail.

Figure 10:
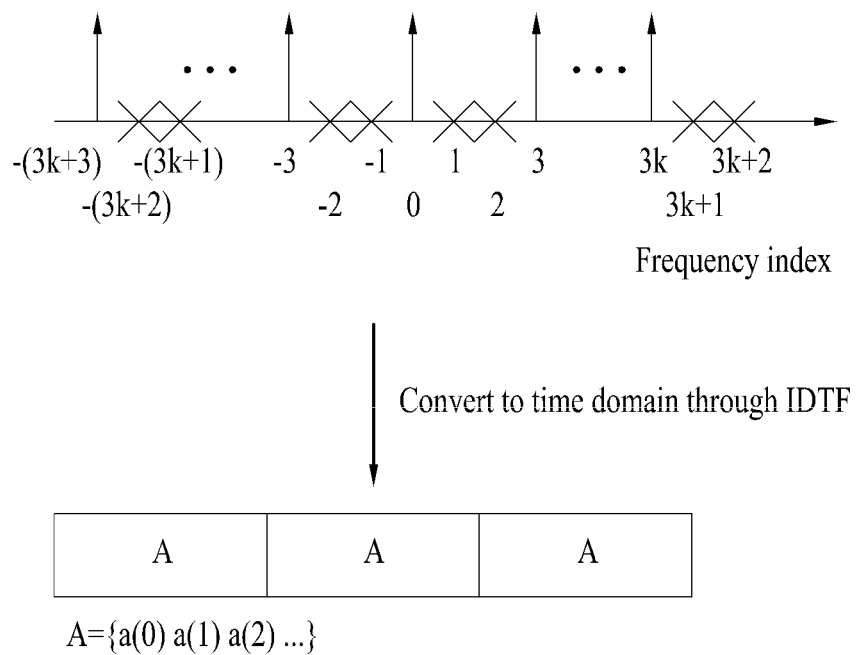
FIG. 10 illustrates an example of a sequence being inserted only in a frequency index position corresponding to a multiple of 3, when the synchronization channel has a structure of being repeated 3 times.

FIG. 10 illustrates an example of a sequence being inserted only in a frequency index position corresponding to a multiple of 3, when the synchronization channel has a structure of being repeated 3 times. In this example, the wave within the time domain is repeated 3 times in an [A A A] format.

Figure 11:
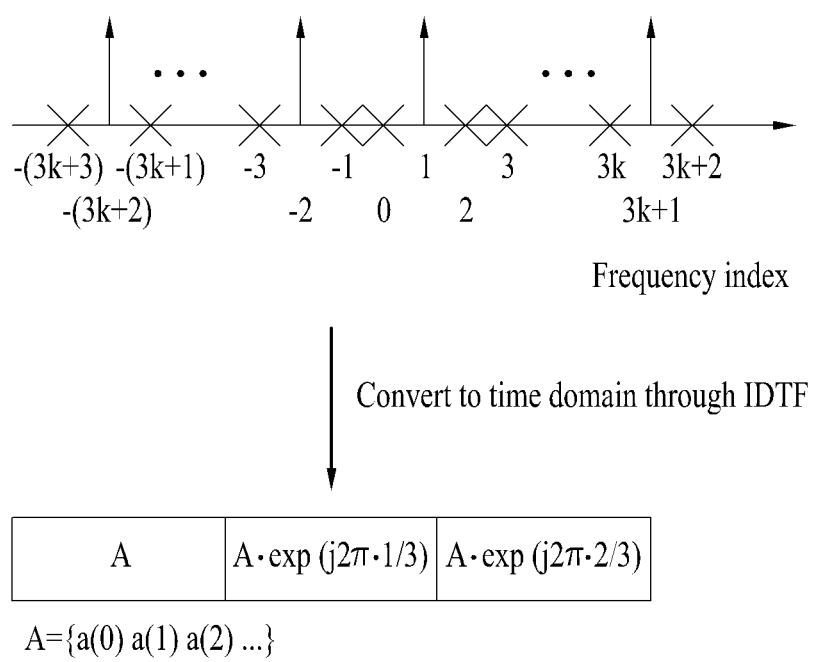
FIG. 11 and FIG. 12 respectively illustrate examples of a sequence being inserted only in a frequency index position that does not correspond to a multiple of 3, when the synchronization channel has a structure of being repeated 3 times.

When the synchronization channel has a 3× repetition structure, FIG. 11 shows an example of inserting a sequence only in a $(3m+1)^{th}$ frequency index position. In this example, the wave within the time domain is repeated 3 times in a [A A·exp(j2π·⅓) A·exp(j2π·⅔)] format.

Figure 12:
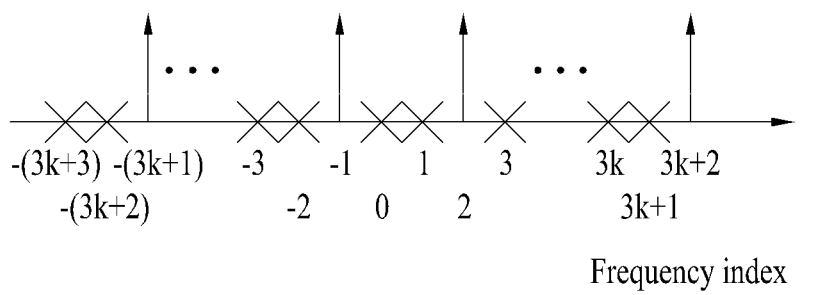

Furthermore, when the synchronization channel has a 3× repetition structure, FIG. 12 shows an example of inserting a sequence only in a $(3m+2)^{th}$ frequency index position. In this example, the wave within the time domain is repeated 3 times in a [A A·exp(j4π·⅓) A·exp(j4π·⅔)] format.

When compared to FIG. 4 and FIG. 5, with the exception that the synchronization channel is repeated 3 times, the same method described in FIG. 4 and FIG. 5 may be applied in FIG. 10 to FIG. 12.

As described above, the method for transmitting a synchronization channel using multi-antenna according to the embodiment of the present invention has the following advantages. In performing time/frequency domain synchronization in the synchronization channel, regardless of the number of transmission antennae used by the base station when transmitting signals, the synchronization process may be performed. Also, the present invention allows multi-antenna gain to be obtained when transmitting the synchronization channel. And, by using the method of the present invention, channel estimation may be performed for each antenna. And, by applying transmission diversity methods to the BCH/control channel/data channel and so on, the performance of the present invention may also be enhanced.

Furthermore, as a method for transmitting a synchronization channel for enhancing the diversity performance of a BCH or control channel in a system using multi-antenna, the present invention may be applied in base stations, user equipments, and so on in various systems including 3GPP LTE, 3GPP LTE-A, IEEE802.16e, IEEE802.16m, and so on.

Although the embodiment of the present invention has been described with reference to the accompanying drawings, the described embodiment of the present invention is merely exemplary. Therefore, it will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting a synchronization channel for use as a phase reference when decoding a broadcast channel, the method comprising:

using a pre-decided shift value for each antenna, wherein the shift value is pre-decided with a user equipment, so as to apply circular shifts to sequences of the synchronization channel; and transmitting the sequences having the circular shifts applied thereto from a base station to the user equipment, wherein a multi-antenna transmission diversity method is applied to the broadcast channel, and wherein a length of a cyclic prefix (CP) that is added to the sequences having the circular shift applied thereto is shorter than the shift value.

2. The method of claim 1, wherein a space frequency block code (SFBC) is applied to the multi-antenna transmission diversity method for the broadcast channel.

3. The method of claim 1, wherein applying the circular shifts corresponds to using same mother sequence for each antenna.

4. The method of claim 1, wherein the synchronization channel corresponds to a time domain wave being repeated 2 times within a single Orthogonal Frequency Division Multiplexing (OFDM) symbol.

5. The method of claim 1, wherein the synchronization channel corresponds to a time domain wave being repeated 3 times within a single Orthogonal Frequency Division Multiplexing (OFDM) symbol.

6. The method of claim 1, wherein, when it is assumed that a preamble considers a wave being repeated k times in a time domain, that Tu represents a length of an Orthogonal Frequency Division Multiplexing (OFDM) symbol section, and that Ntx signifies a number of transmission antennae, the shift value is set to Tu/(k*Ntx).

7. A method for transmitting a synchronization channel for use as a phase reference when decoding a broadcast channel, the method comprising:
  transmitting information on different shift values for each antenna to a user equipment;
  using the shift values so as to apply circular shifts to sequences of the synchronization channel; and
  transmitting the sequences having the circular shifts applied thereto from a base station to the user equipment,
wherein a multi-antenna transmission diversity method is applied to the broadcast channel, and
  wherein a length of a cyclic prefix (CP) that is added to the sequences having the circular shift applied thereto is shorter than the shift value.

8. The method of claim 7, wherein applying the circular shifts corresponds to using a same mother sequence for each antenna.

9. The method of claim 7, further comprising:
  adding a cyclic prefix (CP) to a sequence having the circular shift applied thereto.

10. A method for transmitting a synchronization channel for use as a phase reference when decoding a control channel, the method comprising:
  using a pre-decided shift value for each antenna, wherein the shift value is pre-decided with a user equipment, so as to apply circular shifts to sequences of the synchronization channel; and
  transmitting the sequences having the circular shifts applied thereto from a base station to the user equipment,
wherein a multi-antenna transmission diversity method is applied to the control channel, and
  wherein a length of a cyclic prefix (CP) that is added to the sequences having the circular shift applied thereto is shorter than the shift value.

* * * * *